(12) United States Patent
Rocher

(10) Patent No.: US 10,225,099 B2
(45) Date of Patent: Mar. 5, 2019

(54) VEHICLE ELECTRONIC COMPUTER COMPATIBLE WITH THE CAN-FD COMMUNICATION PROTOCOL

(71) Applicants: Continental Automotive France, Toulouse (FR); Continental Automotive GmbH, Hannover (DE)

(72) Inventor: Jacques Rocher, Saint Orens de Gameville (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/756,293

(22) PCT Filed: Aug. 26, 2016

(86) PCT No.: PCT/EP2016/001440
§ 371 (c)(1),
(2) Date: Feb. 28, 2018

(87) PCT Pub. No.: WO2017/041876
PCT Pub. Date: Mar. 16, 2017

(65) Prior Publication Data
US 2018/0254918 A1    Sep. 6, 2018

(30) Foreign Application Priority Data
Sep. 7, 2015  (FR) ..................... 15 58292

(51) Int. Cl.
*G06F 13/42*  (2006.01)
*H04L 12/40*  (2006.01)

(52) U.S. Cl.
CPC .. *H04L 12/40013* (2013.01); *H04L 12/40169* (2013.01); *H04L 2012/40215* (2013.01);
(Continued)

(58) Field of Classification Search
CPC ......... H04L 12/40013; H04L 12/40169; H04L 2012/40241; H04L 2012/40215; H04L 2012/40273
See application file for complete search history.

(56) References Cited

U.S. PATENT DOCUMENTS

| 8,228,953 | B2 * | 7/2012 | Elend ............... H04L 12/40026 370/230 |
| 8,687,520 | B2 * | 4/2014 | Van Wageningen ........................ H04J 3/0676 370/254 |

(Continued)

OTHER PUBLICATIONS

International Preliminary Report on Patentability and Written Opinion for International Application No. PCT/EP2016/001440, dated Mar. 13, 2018, 6 pages.

(Continued)

*Primary Examiner* — Jing-Yih Shyu
(74) *Attorney, Agent, or Firm* — RatnerPrestia

(57) ABSTRACT

A vehicle electronic computer, including a first microcontroller and a second microcontroller including respective FlexRay™ communication controllers that are linked to one another by connections, the first microcontroller and the second microcontroller being configured to exchange data with one another by way of the FlexRay™ communication controllers. Furthermore, the second microcontroller includes a CAN-FD communication controller by way of which the electronic computer is able to be linked to a communication bus of the vehicle in order to exchange data with a remote device, and the CAN-FD communication controller is linked to the FlexRay™ communication controller of the second microcontroller.

12 Claims, 1 Drawing Sheet

(52) U.S. Cl.
CPC ............ *H04L 2012/40241* (2013.01); *H04L 2012/40273* (2013.01)

(56) References Cited

U.S. PATENT DOCUMENTS

| | | | | |
|---|---|---|---|---|
| 2009/0290485 | A1* | 11/2009 | Zinke | H04L 12/40006 370/221 |
| 2009/0300254 | A1* | 12/2009 | Newald | H04L 12/40013 710/305 |
| 2009/0323708 | A1* | 12/2009 | Ihle | G06F 13/28 370/402 |
| 2010/0061404 | A1* | 3/2010 | Newald | H04L 7/10 370/503 |
| 2012/0233500 | A1* | 9/2012 | Roettgernnann | G06F 11/3636 714/25 |
| 2012/0278507 | A1* | 11/2012 | Menon | H04J 3/0655 709/248 |
| 2014/0047282 | A1* | 2/2014 | Deb | G06F 11/0751 714/48 |

OTHER PUBLICATIONS

Chair & Presenter: Thomas Hogenmuller, Bosch et al: "1 Twisted Pair 100 [C] Mbit/s Ethernet Call for Interest at IEEE802.3 Working Grp. Beijing, Mar. 19, 2014, Plenary Meeting; CFI_02_0314," IEEE Draft; CFI_02_0314, IEEE-SA, Piscataway, NJ, vol. 802.3, pp. 1-41, XP068067516, Retrieved from the Internet: URL:http://www.ieee802.org/3/cfi/0314_2/CFI_02_0314.pdf [retrieved on Mar. 19, 2014] the whole document.

Flexray Consortium, et al., "Flexray Communications System Protocol Specification Version 3.0.1," Oct. 31, 2010, pp. 1-341, XP055022829, Retrieved from the Internet: URL:https://svn.ipd.kit.edu/nlrp/public/Flexray/Flexray%E2%84%A2%20Protocol%20Specification%20Version%203.0.1.pdf [retrieved on Mar. 26, 2012] the whole document.

International Search Report and Written Opinion for International Application No. PCT/EP2016/001440, dated Nov. 14, 2016, 7 pages.

* cited by examiner

VEHICLE ELECTRONIC COMPUTER COMPATIBLE WITH THE CAN-FD COMMUNICATION PROTOCOL

CROSS REFERENCE TO RELATED APPLICATIONS

This application is the U.S. National Phase Application of PCT International Application No. PCT/EP2016/001440, filed Aug. 26, 2016, which claims priority to French Patent Application No. 1558292, filed Sep. 7, 2015, the contents of such applications being incorporated by reference herein.

FIELD OF THE INVENTION

The present invention belongs to the field of electronic computers on board vehicles, in particular motor vehicles. The present invention relates more particularly to an electronic computer compatible with the CAN-FD communication protocol.

BACKGROUND OF THE INVENTION

The CAN ("Controller Area Network" in the literature) communication protocol, as defined by the ISO 11898 standards, incorporated by reference herein is widely used in modern motor vehicles.

An electronic computer on board a motor vehicle, compatible with the CAN communication protocol, generally includes a CAN communication controller (defined by the standard ISO 11898-1) incorporated by reference herein linked to a CAN bus driver (defined by the standard ISO 11898-2/3) incorporated by reference herein that primarily forms the physical interface between the CAN communication controller and a communication bus. Such a bus driver is generally referred to as a "transceiver" in the literature.

It is nowadays being contemplated to integrate a new communication protocol into motor vehicles, namely the CAN-FD ("CAN with Flexible Data rate" in the literature) communication protocol. The CAN-FD communication protocol (defined by the standard ISO 11898-7) incorporated by reference herein is an improvement of the CAN communication protocol. In comparison with said CAN communication protocol, the CAN-FD communication protocol increases the efficiency of communication on the communication bus by increasing the bit rate and by increasing the size of the frame that is used.

In order to use the CAN-FD communication protocol, new electronic computer architectures are currently being developed that are based in particular on the use of more powerful microcontrollers.

However, the use of a new type of microcontroller generally brings about significant software developments, meaning that such a solution is not able to be contemplated either in the very short term, for quick integration of the CAN-FD communication protocol into motor vehicles, or at a small extra cost in comparison with the current solutions.

SUMMARY OF THE INVENTION

An aim of the present invention is to fully or partly mitigate limitations of the prior art solutions, in particular those outlined above, by proposing a solution that enables quicker integration of the CAN-FD communication protocol while at the same time limiting the impact on the cost of manufacturing the corresponding electronic computer.

To this end, and according to a first aspect, the invention relates to a vehicle electronic computer, said electronic computer including a first microcontroller and a second microcontroller including respective FLEXRAY™ communication controllers that are linked to one another by connecting means, the first microcontroller and the second microcontroller being configured to exchange data with one another by way of said FLEXRAY™ communication controllers. Furthermore, the second microcontroller includes a CAN-FD communication controller by way of which said electronic computer is able to be linked to a communication bus of the vehicle in order to exchange data with a remote device, and said CAN-FD communication controller is linked to the FLEXRAY™ communication controller of said second microcontroller.

The electronic computer thus includes two microcontrollers that use FLEXRAY™ communication controllers (such as defined by the standard ISO 17458-2) incorporated by reference herein to communicate with one another.

The FLEXRAY™ communication protocol (defined overall by the standards ISO 17458-1 to 17458-5) incorporated by reference herein is widely supported by current electronic computers for the exchange of data between remote electronic computers that are linked by the communication bus of the vehicle. The FLEXRAY™ communication protocol therefore corresponds to an alternative to the CAN and CAN-FD communication protocols. As a result, the majority of current microcontrollers already include FLEXRAY™ communication controllers, and the invention proposes using these in a different manner, namely to exchange data between two microcontrollers within one and the same electronic computer.

As a result, the first microcontroller, which is typically the microcontroller that carries out the various tasks assigned to the electronic computer (for example controlling the engine of the vehicle in the case of an engine computer), may in some cases be an off-the-shelf microcontroller. The only difference in comparison with the prior art, but that is transparent for said first microcontroller, is that the FLEXRAY™ communication controller is not used to communicate directly on the communication bus of the vehicle, which bus is external to the electronic computer, but to communicate with the second microcontroller via connecting means that are internal to the electronic computer.

The second microcontroller incorporates the CAN-FD communication controller that is used to communicate on the communication bus of the vehicle, and the exchanges of data between the first microcontroller and the communication bus of the vehicle are carried out by way of the second microcontroller. The use of the FLEXRAY™ communication protocol is advantageous in that the bit rate and the size of the FLEXRAY™ frame are compatible with those of the CAN-FD communication protocol. As a result, the first microcontroller is able to communicate with the second microcontroller without having to know that the exchanges of data, on the communication bus of the vehicle, are ultimately being carried out in accordance with the CAN-FD communication protocol. Specifically, the second microcontroller is able to provide the gateway between the FLEXRAY™ and CAN-FD communication protocols, such that no software development is necessary on the part of the first microcontroller on account of the fact that the CAN-FD communication protocol is used on the communication bus of the vehicle.

Thus, only the second microcontroller potentially requires specific software developments. However, said software developments relate only to the use of the CAN-FD communication protocol, and not to the main tasks assigned to the electronic computer (for example: controlling the engine of the vehicle), which tasks are preferably managed by the first microcontroller. Furthermore, the use of a second microcontroller is more economical than the use of purely hardware-based solutions of FPGA, ASIC, etc. type, and moreover exhibits the advantage of greater flexibility in the face of possible subsequent modifications of the CAN-FD communication protocol.

In particular embodiments, the electronic computer may furthermore include one or more of the following features, taken alone or in any technically possible combination.

In particular embodiments, the connecting means include an interfacing logic circuit including logic gates linking respective TxD, TxEN and RxD terminals of the FLEXRAY™ communication controllers of the first microcontroller and of the second microcontroller of the electronic computer.

Specifically, with the FLEXRAY™ communication protocol being implemented in order to exchange data between two microcontrollers within one and the same electronic computer, the connecting means between the FLEXRAY™ communication controllers may be greatly simplified in comparison with a conventional FLEXRAY™ communication bus. In particular, it is not necessary to use what is termed, in FLEXRAY™ terminology, a FLEXRAY™ bus driver (or "BD", defined by the standard ISO 17458-4), and the connecting means may primarily include an interfacing logic circuit based on simple logic gates and linking the respective TxD, TxEN and RxD terminals of the FLEXRAY™ communication controllers.

In particular embodiments, the interfacing logic circuit includes:
- a first transmission logic gate having two inputs linked to the TxD and TxEN terminals, respectively, of the FLEXRAY™ communication controller of the first microcontroller,
- a second transmission logic gate having two inputs linked to the TxD and TxEN terminals, respectively, of the FLEXRAY™ communication controller of the second microcontroller,
- a combinational logic gate having two inputs linked to an output of the first transmission logic gate and to an output of the second transmission logic gate, respectively, said combinational logic gate furthermore having an output linked to the RxD terminals of the FLEXRAY™ communication controllers of the first microcontroller and of the second microcontroller.

In particular embodiments, the first transmission logic gate, the second transmission logic gate and the combinational logic gate are logic gates of NAND type.

In particular embodiments, the interfacing logic circuit includes a receiving logic gate having:
- an input linked to the output of the combinational logic gate,
- an input linked to an RxEN terminal of the FLEXRAY™ communication controller of the first microcontroller,
- an output linked to the RxD terminal of said FLEXRAY™ communication controller of said first microcontroller.

In particular embodiments, the interfacing logic circuit includes a receiving logic gate having:
- an input linked to the output of the combinational logic gate,
- an input linked to an RxEN terminal of the FLEXRAY™ communication controller of the second microcontroller,
- an output linked to the RxD terminal of said FLEXRAY™ communication controller of said second microcontroller.

In particular embodiments, each receiving logic gate is a logic gate of NAND type.

In particular embodiments, the connecting means between the FLEXRAY™ communication controllers of the first microcontroller and of the second microcontroller do not have a FLEXRAY™ bus driver.

According to a second aspect, the present invention relates to a motor vehicle including at least one electronic computer according to any one of the embodiments of the invention.

BRIEF DESCRIPTION OF THE DRAWINGS

The invention will be better understood upon reading the following description, given by way of entirely nonlimiting example and with reference to the figures, in which.

In these figures, identical references from one figure to another denote identical or analogous elements. For the sake of clarity, the elements shown are not to scale, unless indicated otherwise.

DETAILED DESCRIPTION OF THE PREFERRED EMBODIMENTS

The present invention relates to an electronic computer 20 for a vehicle. In the remainder of the description, reference is made, without limitation, to the case of a motor vehicle 10.

However, it should be noted that the invention may be applied to any type of vehicle in which the use of the CAN-FD communication protocol is able to be contemplated, including aircraft.

Figure 1:
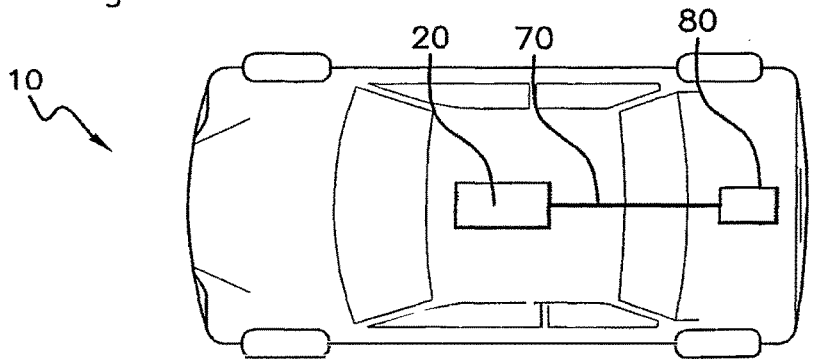
FIG. 1 shows a schematic representation of a vehicle including an electronic computer that is compatible with the CAN-FD communication protocol.

FIG. 1 schematically shows a motor vehicle 10 including an electronic computer 20 linked to a remote device 80 by a communication bus 70 of the motor vehicle 10.

The electronic computer 20 may be any one of the electronic computers on board a motor vehicle, for example the engine computer, the passenger compartment computer, etc. In the remainder of the description, reference is made, without limitation, to the case where the electronic computer 20 is the engine computer of the motor vehicle 10.

In the example illustrated by FIG. 1, the remote device 80, such as another electronic computer, is also on board the motor vehicle 10. It should be noted that the electronic computer 20 may also be linked, by the communication bus 70, to a device that is not on board the motor vehicle 10, for example a fault detection device connected to the communication bus 70 only during maintenance operations on the motor vehicle 10.

Figure 2:
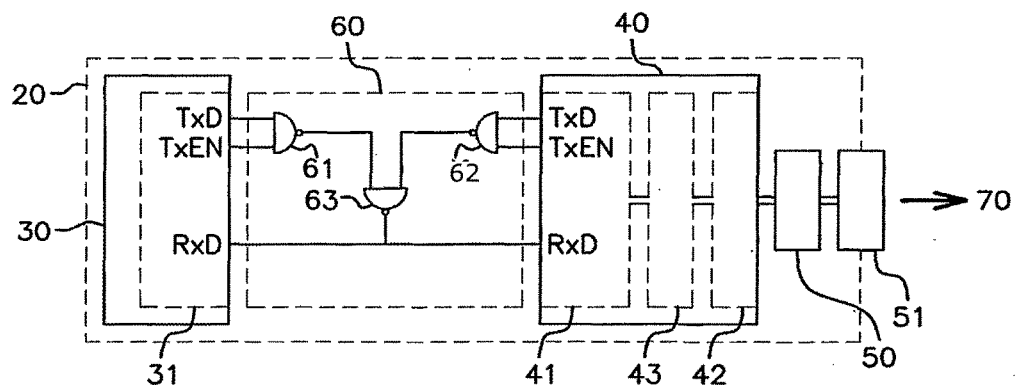
FIG. 2 shows a schematic representation of an exemplary embodiment of an electronic computer according to the invention.

FIG. 2 schematically shows an exemplary embodiment of the electronic computer 20.

As illustrated by FIG. 2, the electronic computer 20 includes a first microcontroller 30 and a second microcontroller 40.

"Microcontroller" is understood to mean an electronic circuit including at least one processor and memory means in which a computer program product, in the form of a set of program code instructions to be executed by said processor, is stored in memory.

As illustrated by FIG. 2, the first microcontroller 30 includes a FLEXRAY™ communication controller 31 and the second microcontroller 40 also includes a FLEXRAY™ communication controller 41.

"FLEXRAY™ communication controller" is understood to mean what is termed, in FLEXRAY™ terminology, a communication controller ("CC") as defined by the standard ISO 17458-2.

The FLEXRAY™ communication controllers 31, 41 of the first microcontroller 30 and of the second microcontroller 40 are linked to one another by connecting means. As indicated previously, the FLEXRAY™ communication controllers 31, 41 are implemented in order to exchange data between two different microcontrollers both located within one and the same electronic computer 20, in contrast to the prior art in which the FLEXRAY™ communication protocol is implemented in order to exchange data between remote electronic computers. Said connecting means are therefore internal to the electronic computer 20, in contrast to the communication bus 70 which is external to the electronic computer 20, deployed inside the motor vehicle 10.

Besides the FLEXRAY™ communication controller 41, the second microcontroller 40 includes a CAN-FD communication controller 42 that is intended to be linked to the communication bus 70 of the motor vehicle 10. For example, and as illustrated in FIG. 2, the CAN-FD communication controller 42 is linked to a CAN-FD bus driver 50 ("CAN-FD transceiver" in the literature), which bus driver is itself linked to a connector 51 that is intended to be connected to the communication bus 70 of the motor vehicle 10. In the nonlimiting example illustrated by FIG. 2, the CAN-FD bus driver 50 is external to the second microcontroller 40, for example a dedicated electronic circuit. However, in other examples, there is nothing to rule out incorporating all or some of said CAN-FD bus driver 50 into the second microcontroller 40.

The FLEXRAY™ communication controller 41 of the second microcontroller 40 is furthermore linked to the CAN-FD communication controller 42, for example by way of a FLEXRAY™/CAN-FD interfacing module 43 that forms the gateway between the FLEXRAY™ communication protocol and the CAN-FD communication protocol.

The first microcontroller 30 is thus able to transmit and receive data on the communication bus 70 of the motor vehicle 10 by way of the second microcontroller 40, the exchanges of data between said first microcontroller 30 and said second microcontroller 40 being carried out by way of the FLEXRAY™ communication controllers 31, 41 and of the connecting means between said V communication controllers. From the point of view of the first microcontroller 30, the exchanges of data are therefore carried out in accordance with the FLEXRAY™ communication protocol, such that no software development specific to the CAN-FD communication protocol is necessary for said first microcontroller 30. The software developments to be provided relate primarily to the second microcontroller 40 that forms the gateway between the FLEXRAY™ communication protocol and the CAN-FD communication protocol.

The FLEXRAY™ standards define, besides the FLEXRAY™ communication controller (standard ISO 17458-2), what is termed, in V terminology, a FLEXRAY™ bus driver (or "BD", defined by the standard ISO 17458-4) that primarily forms the physical interface between the FLEXRAY™ communication controller and a communication bus. In the embodiment illustrated by FIG. 2, the connecting means advantageously do not have FLEXRAY™ bus drivers.

Specifically, while the FLEXRAY™ bus drivers are necessary in the case of communication on an external communication bus, which communication may be of a significant length and subjected to significant electromagnetic interference, this no longer holds true in the case of a communication within one and the same electronic computer 20, given that the distance between the first microcontroller 30 and the second microcontroller 40 is small and that the electromagnetic interference is well controlled.

As a result, connecting means that are less complex and less expensive than those of the FLEXRAY™ bus drivers (the cost of which is incidentally high) are able to be used to link the FLEXRAY™ communication controllers 31, 41 of the first microcontroller 30 and of the second microcontroller 40.

As defined by the standards ISO 17458-2 and ISO 17458-4, the interface between a FLEXRAY™ communication controller and a FLEXRAY™ bus driver primarily uses the following signals:

- a "Transmit Data" or TxD signal that corresponds to the data transmitted by the FLEXRAY™ communication controller,
- a "Transmit Data Enable Not" or TxEN signal, by way of which the FLEXRAY™ communication controller indicates to the FLEXRAY™ bus driver whether the TxD signal has to be transmitted on the communication bus,
- a "Receive Data" or RxD signal that corresponds to the data received by the FLEXRAY™ communication controller.

As illustrated by FIG. 2, the FLEXRAY™ communication controllers 31, 41 of the first microcontroller 30 and of the second microcontroller 40 include respective TxD, TxEN and RxD terminals, to which the respective TxD, TxEN and RxD signals transit.

In the example illustrated by FIG. 2, the connecting means advantageously take the form of an interfacing logic circuit 60, formed primarily of logic gates, that links the respective TxD, TxEN and RxD terminals of the FLEXRAY™ communication controllers 31, 41 of the first microcontroller 30 and of the second microcontroller 40.

More particularly, the interfacing logic circuit 60 illustrated in FIG. 2 includes:

- a first transmission logic gate 61 having two inputs linked to the TxD and TxEN terminals, respectively, of the FLEXRAY™ communication controller 31 of the first microcontroller 30,
- a second transmission logic gate 62 having two inputs linked to the TxD and TxEN terminals, respectively, of the FLEXRAY™ communication controller 41 of the second microcontroller 40,
- a combinational logic gate 63 having two inputs linked to an output of the first transmission logic gate 61 and to an output of the second transmission logic gate 62, respectively, said combinational logic gate furthermore having an output linked to the RxD terminals of the FLEXRAY™ communication controllers 31, 41 of the first microcontroller 30 and of the second microcontroller 40.

Thus, the first transmission logic gate 61 combines the signals supplied on the TxD and TxEN terminals of the FLEXRAY™ communication controller 31 of the first microcontroller 30, whereas the second transmission logic gate 62 combines the signals supplied on the TxD and TxEN terminals of the FLEXRAY™ communication controller 41 of the second microcontroller 40.

The combinational logic gate 63 combines the signals at the output of the first transmission logic gate 61 and of the second transmission logic gate 62, and the result of this combination is supplied on the RxD terminals of the FLEXRAY™ communication controllers 31, 41 of the first microcontroller 30 and of the second microcontroller 40. In this way, the data transmitted by a FLEXRAY™ communication controller 31, 41 on its TxD terminal are presented both:

- to the RxD terminal of this same FLEXRAY™ communication controller 31, 41, thus ensuring that the transmitted data are reread, as provided for by the FLEXRAY™ communication protocol in order to detect any collisions on the communication bus,
- to the RxD terminal of the other FLEXRAY™ communication controller 31, 41, in order to ensure the exchanging of data between the first microcontroller 30 and the second microcontroller 40.

In the example illustrated by FIG. 2, the first transmission logic gate 61, the second transmission logic gate 62 and the combinational logic gate 63 are logic gates of NAND ("not-and") type. However, in other examples, there is nothing to rule out considering an interfacing logic circuit 60 having a different combination of logic gates.

As defined by the standards ISO 17458-2 and ISO 17458-4, the interface between a FLEXRAY™ communication controller and a V bus driver may optionally use an RxEN ("Receive Data Enable Not") signal.

Figure 3:
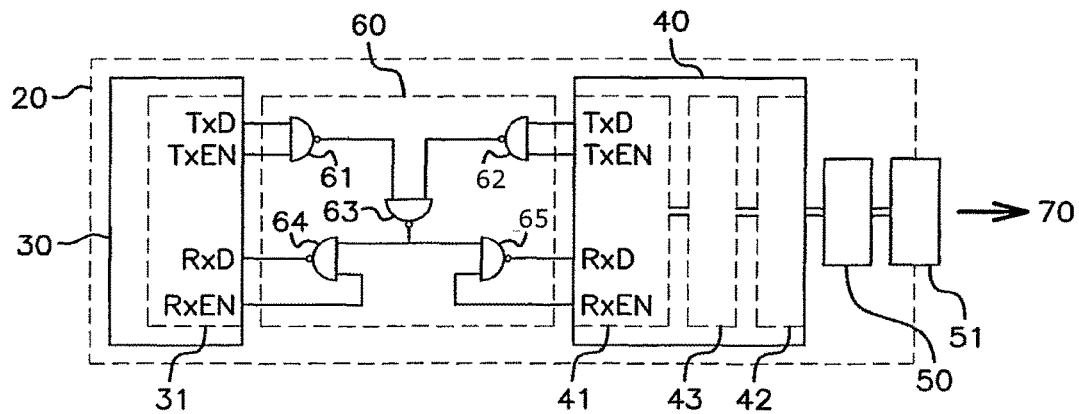
FIG. 3 shows a schematic representation of a variant embodiment of the electronic computer of FIG. 2.

FIG. 3 schematically shows a variant embodiment of the electronic computer 20 of FIG. 2 in the case where the FLEXRAY™ communication controllers 31, 41 each include an RxEN terminal to which the RxEN signal transits. As illustrated by FIG. 3, the interfacing logic circuit 60 furthermore includes a first receiving logic gate 64 and a second receiving logic gate 65.

The first receiving logic gate 64, of NAND type in the nonlimiting example shown in FIG. 3, has:

- an input linked to the output of the combinational logic gate 63,
- an input linked to the RxEN terminal of the FLEXRAY™ communication controller 31 of the first microcontroller 30,
- an output linked to the RxD terminal of said FLEXRAY™ communication controller 31 of said first microcontroller 30.

Analogously, the second receiving logic gate 65, also of NAND type in the nonlimiting example shown in FIG. 3, has:

- an input linked to the output of the combinational logic gate 63,
- an input linked to the RxEN terminal of the FLEXRAY™ communication controller 41 of the second microcontroller 40,
- an output linked to the RxD terminal of said FLEXRAY™ communication controller 41 of said second microcontroller 40.

In the standards ISO 17458-2 and ISO 17458-4, it is in principle the FLEXRAY™ bus driver that controls the value of the RxEN signal presented to the RxEN terminal of the FLEXRAY™ communication controller. In the example illustrated by FIG. 3, given that there is no FLEXRAY™ bus driver, it is advantageously the FLEXRAY™ communication controllers 31, 41 that control the value of the RxEN signal that they have on their RxEN terminal, so as to authorize or not to authorize the receipt of data on their RxD terminal. In particular, the FLEXRAY™ communication controllers 31, 41 may prohibit the receipt of data on their RxD terminal during particular operating phases, for example when the microcontroller is started up or reset, etc.

It should be noted that, with the RxEN signal being optional, it is also possible for only one of the FLEXRAY™ communication controllers 31, 41 to be equipped with an RxEN terminal. The interfacing logic circuit 60, if necessary, has a single receiving logic gate associated with the FLEXRAY™ communication controller 31, 41 having an RxEN terminal.

Furthermore, it is also possible, according to other exemplary embodiments, to force the value of the RxEN signal presented to the RxEN terminal of one or of each FLEXRAY™ communication controller 31, 41 to the value that authorizes the receipt of data on the RxD terminal (in this case the value "low"), without involving said FLEXRAY™ communication controller 31, 41. In such a case, it is not necessary to use a receiving logic gate 64, 65, and the output of the combinational logic gate 63 may be linked directly to the RxD terminal of the FLEXRAY™ communication controller 31, 41.

More generally, it should be noted that the embodiments considered above have been described by way of non-limiting example, and that other variants are therefore conceivable.

In particular, the invention has been described taking into consideration, to connect the FLEXRAY™ communication controllers 31, 41 of the first microcontroller 30 and of the second microcontroller 40, connecting means that do not have FLEXRAY™ bus drivers. However, according to other examples, there is nothing to rule out using FLEXRAY™ bus drivers to connect the FLEXRAY™ communication controllers 31, 41 of the first microcontroller 30 and of the second microcontroller 40. It is understood, however, that the use of an interfacing logic circuit 60, formed essentially of logic gates, corresponds to a preferred embodiment insofar as the connecting means that are implemented are then particularly simple and inexpensive.

The description above clearly illustrates that, through its various features and the advantages thereof, the present invention achieves the aims that it has set itself. In particular, the first microcontroller 30 does not require any specific software development linked to the use of the CAN-FD communication protocol on the communication bus 70 of the motor vehicle 10. Furthermore, the extra cost linked to the use of the CAN-FD communication protocol is controlled, in particular when the electronic computer 20 does not have FLEXRAY™ bus drivers.

The invention claimed is:

1. An electronic computer for a vehicle comprising:
a first microcontroller, and
a second microcontroller
each microcontroller including respective FLEXRAY™ communication controllers that are linked to one another by connecting means,
the first microcontroller and the second microcontroller configured to exchange data with one another by way of the FLEXRAY™ communication controllers,
the second microcontroller includes a CAN-FD communication controller by which the electronic computer is able to be linked to a communication bus of the vehicle in order to exchange data with a remote device,
the CAN-FD (CAN (Controller Area Network) with Flexible Data rate) communication controller is linked to the FLEXRAY™ communication controller of the second microcontroller, wherein the connecting means comprises an interfacing logic circuit including logic gates linking respective TxD, TxEN and RxD terminals of the FLEXRAY™ communication controllers of the first microcontroller and of the second microcontroller of the electronic computer.

2. The electronic computer as claimed in claim 1, wherein the interfacing logic circuit includes:
   a first transmission logic gate having two inputs linked to the TxD and TxEN terminals, respectively, of the FLEXRAY™ communication controller of the first microcontroller,
   a second transmission logic gate having two inputs linked to the TxD and TxEN terminals, respectively, of the FLEXRAY™ communication controller of the second microcontroller, and
   a combinational logic gate having two inputs linked to an output of the first transmission logic gate and to an output of the second transmission logic gate, respectively, the combinational logic gate furthermore having an output linked to the RxD terminals of the FLEXRAY™ communication controllers of the first microcontroller and of the second microcontroller.

3. The electronic computer as claimed in claim 2, wherein the first transmission logic gate, the second transmission logic gate and the combinational logic gate are NAND type logic gates.

4. The electronic computer as claimed in claim 2, wherein the interfacing logic circuit includes a receiving logic gate having:
   an input linked to the output of the combinational logic gate,
   an input linked to an RxEN terminal of the FLEXRAY™ communication controller of the first microcontroller, and
   an output linked to the RxD terminal of the FLEXRAY™ communication controller of the first microcontroller.

5. The electronic computer as claimed in claim 2, wherein the interfacing logic circuit includes a receiving logic gate having:
   an input linked to the output of the combinational logic gate,
   an input linked to an RxEN terminal of the FLEXRAY™ communication controller of the second microcontroller and
   an output linked to the RxD terminal of the FLEXRAY™ communication controller of the second microcontroller.

6. The electronic computer as claimed in claim 4, wherein each receiving logic gate is a NAND type logic gate.

7. The electronic computer as claimed in claim 1, wherein the connecting means between the FLEXRAY™ communication controllers of the first microcontroller and of the second microcontroller lack a FLEXRAY™ bus driver.

8. A motor vehicle comprising at least one electronic computer as claimed in claim 1.

9. The electronic computer as claimed in claim 3, wherein the interfacing logic circuit includes a receiving logic gate having:
   an input linked to the output of the combinational logic gate,
   an input linked to an RxEN terminal of the FLEXRAY™ communication controller of the first microcontroller, and
   an output linked to the RxD terminal of the FLEXRAY™ communication controller of the first microcontroller.

10. The electronic computer as claimed in claim 3, wherein the interfacing logic circuit includes a receiving logic gate having:
   an input linked to the output of the combinational logic gate,
   an input linked to an RxEN terminal of the FLEXRAY™ communication controller of the second microcontroller, and
   an output linked to the RxD terminal of the FLEXRAY™ communication controller of the second microcontroller.

11. The electronic computer as claimed in claim 4, wherein the interfacing logic circuit includes a receiving logic gate having:
   an input linked to the output of the combinational logic gate,
   an input linked to an RxEN terminal of the FLEXRAY™ communication controller of the second microcontroller, and
   an output linked to the RxD terminal of the FLEXRAY™ communication controller of the second microcontroller.

12. The electronic computer as claimed in claim 5, wherein each receiving logic gate is a NAND type logic gate.

* * * * *